No. 688,805. Patented Dec. 10, 1901.
E. WILSON.
ALTERNATING CURRENT MOTOR.
(Application filed Jan. 17, 1898.)
(No Model.)
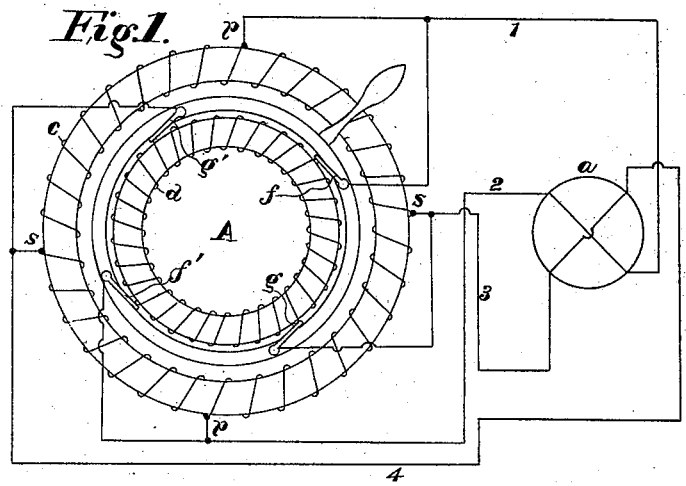
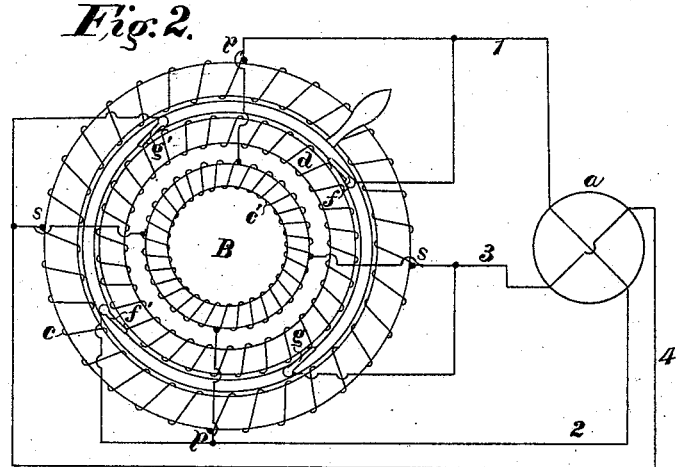
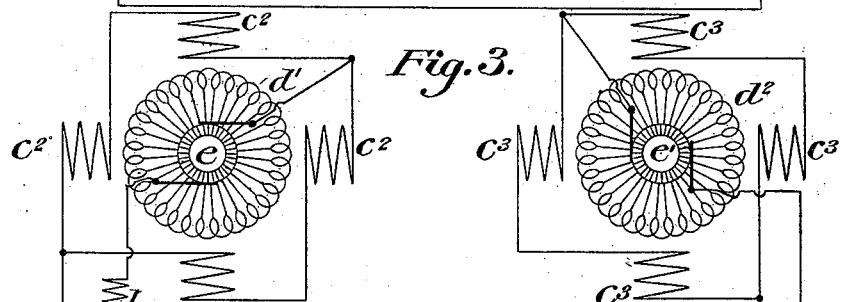
WITNESSES:
Ethan D. Dodds
Hubert C. Tener
INVENTOR
Ernest Wilson
BY
Terry and Mackaye
ATTORNEYS

UNITED STATES PATENT OFFICE.

ERNEST WILSON, OF COUNTY OF KENT, ENGLAND.

ALTERNATING-CURRENT MOTOR.

SPECIFICATION forming part of Letters Patent No. 688,805, dated December 10, 1901.

Application filed January 17, 1893. Serial No. 458,742. (No model.)

*To all whom it may concern:*

Be it known that I, ERNEST WILSON, a subject of the Queen of Great Britain, residing in the county of Kent, England, have invented certain new and useful Improvements in Alternating-Current Motors, (for which I have obtained a patent in Great Britain, No. 18,525, dated December 18, 1888,) of which the following is a specification.

My invention relates to alternating-current electric motors, and more particularly to that class of motors operated by multiphase currents.

The object of my invention is to produce a motor in which the stationary and rotatable members are both supplied with a plurality of currents differing in phase in such manner that magnetic fields of approximately equal strength will be produced which will rotate in the same direction and by their interaction effect the mechanical rotation of the movable member of the motor.

Several combinations and arrangements of circuits may be made whereby two alternating currents of the character described may be made to produce the desired result, as is indicated in the accompanying drawings, in which—

Figure 1 is a diagram of a motor provided with one stationary and one rotary closed-coil winding, both of which are supplied with two-phase currents from a suitable generator. Fig. 2 is a similar view of a modification in which three concentric windings are employed, two of which are stationary and the other of which is rotatable. Fig. 3 represents diagrammatically windings for both members of the motor in which separate circuits for the two phases of current are employed.

Referring now to Fig. 1 of the drawings, $a$ represents a suitable source of two-phase alternating currents, and A a two-phase motor, constructed in accordance with my invention. The outer stationary member of the motor is provided with a continuous-ring winding $c$, to diametrically opposite points $p$ of which are connected the circuit 1 2, supplied with current of one phase from the generator $a$. To diametrically opposite points $s$ in the winding $c$ at right angles to the points $p$ are correspondingly connected the conductors 3 4 for the current from the generator $a$, which differs in phase by ninety degrees from that in the conductors 1 2. The inner rotatable member of the motor A is provided with a closed-coil winding $d$. The several turns of the winding $d$ will preferably be connected in practice to the segments of a commutator-cylinder; but for convenience of illustration this commutator is omitted from the drawings, and brushes $f f' g g'$ are shown as bearing directly upon this winding. It will be readily understood that the arrangement shown does not differ electrically from a construction in which the commutator-cylinder is employed and the brushes are made to bear upon such cylinder. The brushes $f f'$ are respectively connected to the conductors 1 and 2 and the brushes $g g'$ to the conductors 3 and 4. These brushes are preferably so mounted that they may be adjusted annularly in order to vary the angle between them and the points $p p$ and $s s$ of the stationary winding. If these brushes coincide in angular position with the points $p p$ and $s s$, it will be understood that the poles of the two magnetic fields produced by the two windings will coincide and there will be no tendency to mechanical rotation. If, however, the brushes be moved either to the right or to the left, there will be such an interaction between the two magnetic fields as will cause the rotation of the movable member of the motor, the direction of such rotation being dependent upon whether the brushes are moved to the left or to the right. The maximum rotative effect will be produced when the brushes are located substantially as indicated in the drawings, and if moved ninety degrees to the left the maximum rotative effect in the opposite direction will result.

When the currents having the necessary difference in phase are derived directly from the generator, as indicated in Figs. 1 and 2, the motor may be operated by connecting the motor-circuits in the proper order to three conductors, making the same lead common to both circuits. This being a common construction and one well known in the art, I have not deemed it necessary to specifically illustrate it.

More than two rotating fields of magnetism may be employed if it be found desirable. For example, when the armature is of the Gramme-ring type there may be in addition to the outer field-magnet coils other field-magnet coils placed inside the armature, the connections being such that the alternating currents will pass around the three sets of coils, those of the outer and inner members being so arranged as to coincide in polarity. With this arrangement they will both tend to cause rotation in the armature. Such a construction I have illustrated in Fig. 2, in which the parts are the same in all respects as those shown in Fig. 1 except that an inner stationary member having a winding $c'$ is provided for the motor B, the member having the winding $d$ being arranged to rotate between the windings $c$ and $c'$, as indicated.

Various means may be employed for securing the required difference in phase necessary to produce the rotating magnetic fields, as will be readily understood, and the phase of the alternating currents derived from any source may be varied by suitable means known in the art.

In Fig. 3 I have shown diagrammatically two windings for the two phases of current on each member of the motor, the windings for each phase being connected together and with the source of current through a commutator. In this figure, $a'$ and $a^2$ represent the sources of the two currents differing in phase, it being understood that these may be combined in a single generator, as is usual. $c^2$ and $d'$ are respectively the stationary and rotary windings supplied with current of one phase from the source $a'$, the connection between them being made by means of the commutator $e$. $r$ is a resistance connected in circuit between the source $a''$ and the commutator $e$. It will be observed that one half of the stationary winding $c^2$ is connected with the generator in parallel with the other half. The rotary winding $d^2$ and the corresponding stationary winding $c^3$ are supplied with current in quadrature to that above described from the source $a^2$, these windings being connected through the commutator $e''$, the commutator-brushes of which are placed at right angles to the brushes of commutator $e$.

A motor constructed in accordance with my invention is self-starting and can be stopped very quickly without interrupting the circuits by causing the poles of the two magnetic fields to coincide by moving the brushes or otherwise changing the relative position of the poles.

While I have illustrated and described a motor operated by two-phase currents, I desire it to be understood that my invention is not limited as regards the particular number of phases employed.

I claim as my invention—

1. In an alternating-current motor, a field-magnet and an armature, each of which is provided with one complete circuit having two pairs of terminals at right angles to each other and means for supplying currents differing in phase to said terminals.

2. An alternating-current motor the rotary and stationary members of which are provided with closed-coil windings traversed by currents differing in phase whereby non-coincident magnetic poles are produced which rotate in the same direction and with the same angular velocity.

3. An alternating-current motor having a plurality of closed-coil windings traversed by currents differing in phase, whereby two sets of non-coincident magnetic poles are produced which rotate in the same direction and at the same speed.

4. In an alternating-current motor, two or more coils closed upon themselves and conveying currents differing in phase in different portions thereof, the magnetic fields produced by said currents rotating with the same angular velocity.

5. In an alternating-current motor, two or more coils, each closed upon itself, and conveying currents differing in phase in different portions thereof, said coils being in inductive relation to each other, and so arranged that the poles produced by the coils do not coincide, though they rotate with the same angular velocity.

6. In an alternating-current motor, coils wound so as to be closed on themselves, and being in inductive relation the one to the other, and means for producing currents in each of said coils differing in phase along different portions of the winding.

7. In an electromotor adapted to be energized by multiphase currents of successive phase, equal period and amplitude, the combination of a fixed member, a rotating member, and means whereby the successive current impulses transmitted to the motor are divided between the fixed and rotating members thereof, and the magnetic axes produced therein progressively shifted in the same direction.

8. In an electromotor adapted to be energized by multiphase currents of successive phase, equal period and amplitude, the combination of a fixed member, a rotating member, and means for dividing each current impulse between the fixed and the rotating member, comprising commutating means for the impulses supplied to one of said members.

9. In an electromotor adapted to be energized by multiphase currents of successive phase, equal period and amplitude, the combination of a fixed member and a rotating member, each comprising an iron core and a coil or coils thereon, said coil or coils divided into a plurality of uniform parts, or sections, and brushes corresponding in number with the division of the coils and communicating between the coils on the fixed and rotating members of said motor.

10. In an electromotor adapted to be energized by multiphase currents, and in which the successive current impulses produce a progressive shifting of the magnetic axes of both the fixed and rotating members of said motor in the same direction, the combination with said fixed and rotating members, of means substantially as described, whereby the angle included between said magnetic axes may be varied, and the effective energy of the motor increased or diminished as desired, without varying the strength of the current impulses transmitted to the motor.

11. An electromotor comprising a closed-circuited fixed member, and a closed-circuited rotatable member, said members being connected together in circuit by means of a plurality of brushes, and suitable connections, so located as to divide the coils on both members into a plurality of uniform parts or sections.

12. In an electromotor adapted to be energized by multiphase currents, and in which the successive current impulses produce a progressive shifting of the magnetic axes of both the fixed and rotating members of said motor in the same direction, of means substantially as described, whereby the direction of rotation of said rotating members may be caused to be opposite to that of said magnetic axes.

13. A multiphase motor having a number of field-coils acting in different directions, and energized by alternating currents of different phase to produce a rotating field, and an armature in said field having a number of coil portions acting in different directions, and energized by multiphase currents so as to produce a rotating armature polarity, the connections and windings being such that the two polarities are non-coincident, but rotate in the same direction and at the same speed.

In testimony whereof I have hereunto subscribed my name this 16th day of November, A. D. 1892.

ERNEST WILSON.

Witnesses:
JNO. C. NEW,
REGINALD BELFIELD.